April 30, 1935.  F. J. KRZYZAK  1,999,464
CRATE
Filed July 2, 1932  3 Sheets-Sheet 1

Inventor
Frank J. Krzyzak
By: Cheever, Cox & Moore attys.

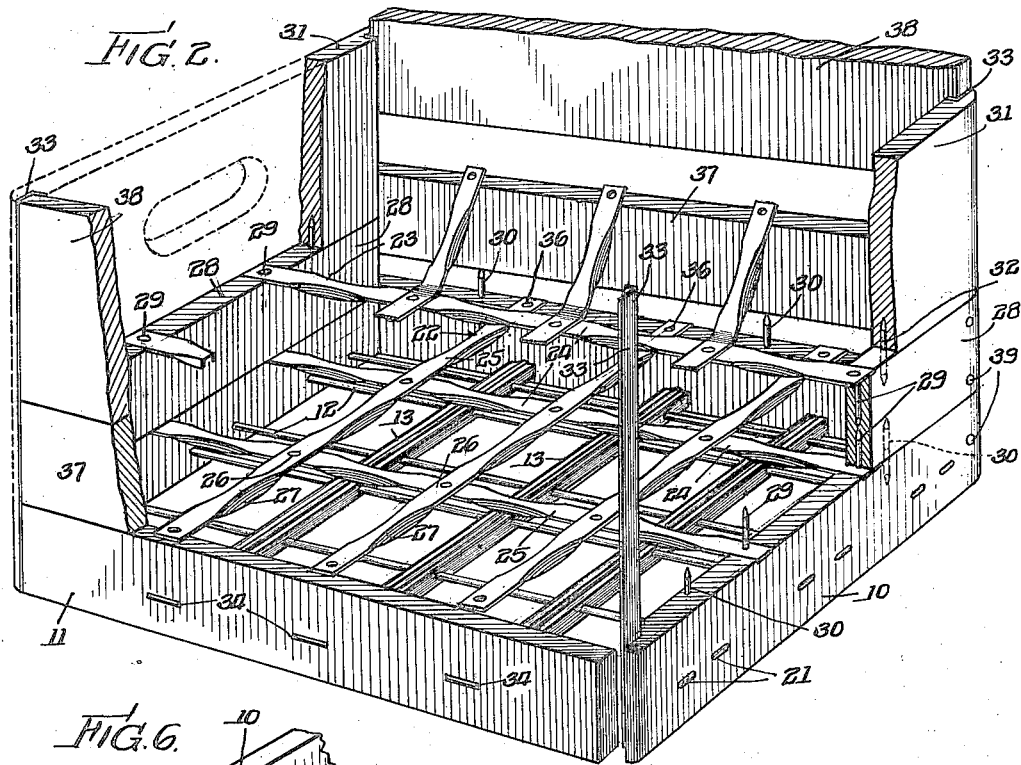

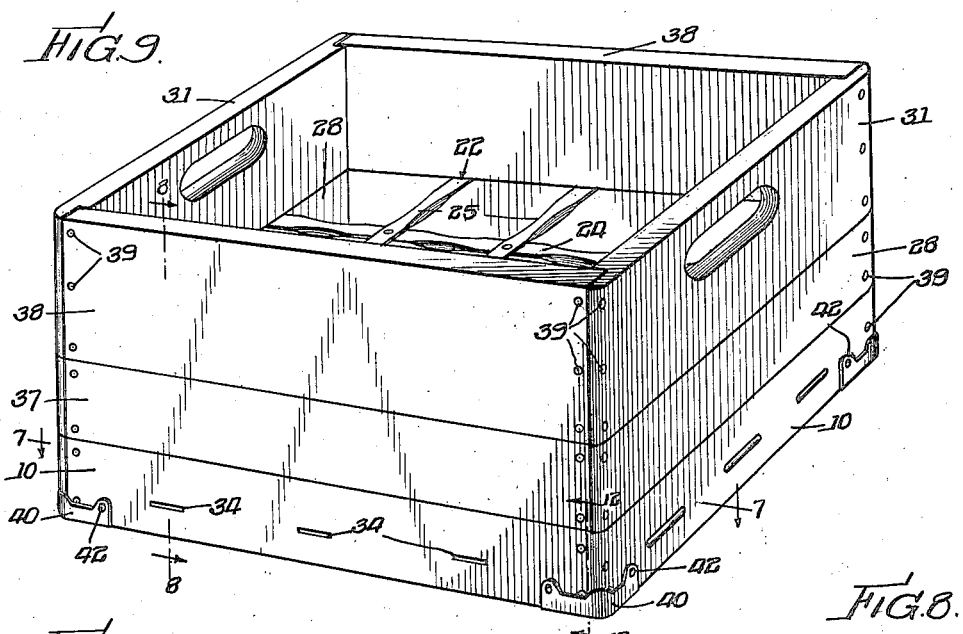
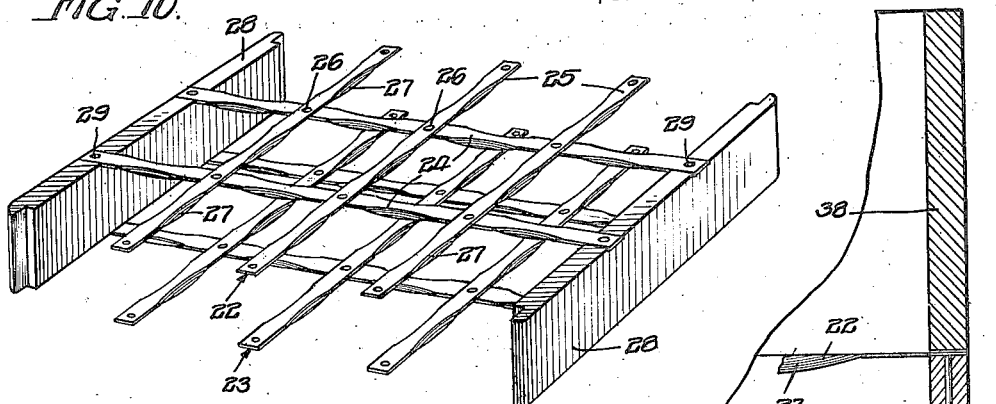
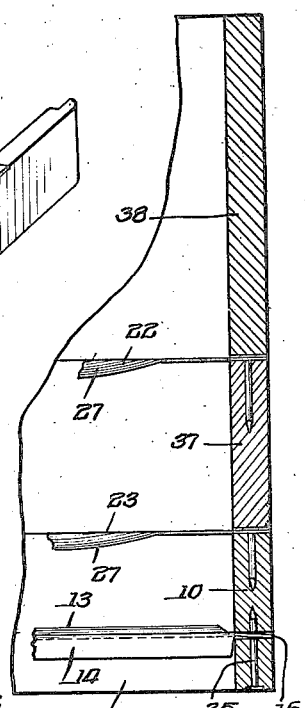
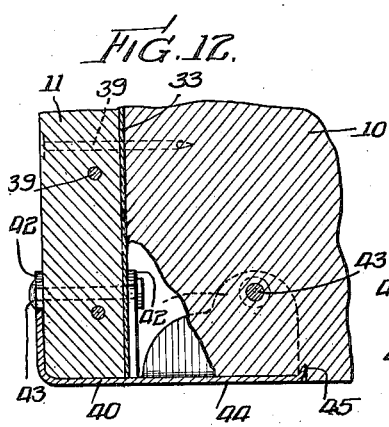
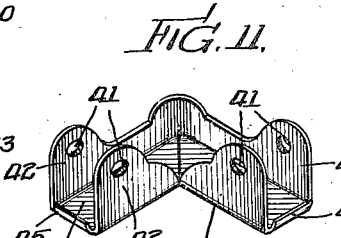
Inventor:
Frank J. Krzyzak
By: Cheever, Cox & Moore attys.

Patented Apr. 30, 1935

1,999,464

UNITED STATES PATENT OFFICE 1,999,464

CRATE

Frank J. Krzyzak, Chicago, Ill., assignor to Republic Box Company, Chicago, Ill., a corporation of Illinois Application July 2, 1932, Serial No. 620,578

4 Claims. (Cl. 217—20)

The present invention relates to crates which are used for the handling of milk bottles and the like and has for one of its objects the improvement of the bottom structure of the crate as well as the improvement of the manner of mounting the partition strips or separators.

Another object of this invention resides in the method of assembling the crate whereby the crate may be quickly and efficiently assembled.

Other objects of this invention will appear hereinafter as the description thereof proceeds, the novel features, combinations, and arrangements being clearly set forth in the accompanying claims.

In the drawings:

Fig. 2 illustrates another stage in the assembly of the crate;

Fig. 6 is a view similar to Fig. 1 showing a modified construction;

Fig. 7 is a section taken on the line 7—7 of Fig. 9;

Fig. 8 is a section taken on the line 8—8 of Fig. 9;

Fig. 9 is an assembly view of the crate with the corner bracket in place;

Fig. 10 is a detail perspective view of the corner bracket;

Fig. 11 is a perspective view of the center unit, and;

Fig. 12 is a vertical section taken on the line 12—12 of Fig. 9.

Figure 5:
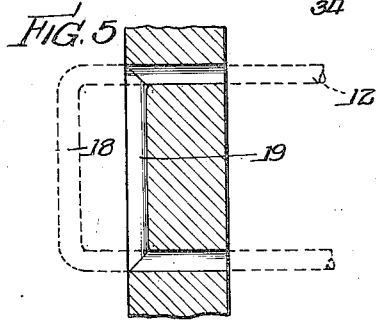
Fig. 5 is an enlarged sectional view showing the detail of the mounting for the rods which support the bottles.

In Fig. 2, I have shown a crate constructed according to my invention and shown in one stage of its assembly. In this view the reference numeral 10 represents the bottom end boards and 11 represents the bottom side boards. As is apparent from an inspection of Fig. 2, the bottom section of the crate taken just above the boards 10 and 11 has rods 12 extending between the opposite end boards 10 and cross bracing strips 13. The cross bracing strips 13 are of channel section as is illustrated clearly in Fig. 4, and comprise depending flanges 14 perforated to receive the rods 12. The opposite ends of the cross bracing members 13 have ears 15 therein perforated at 16 to receive nails or other suitable fastening elements. Each of the rods 13 passes through the perforations in the flanges 14 and through the bottom end boards 10 being secured thereto in a manner which will appear hereinafter as the description of the invention proceeds. The crates are assembled in the following manner. Rods 12 are first formed as U-shaped members indicated at A in Fig. 1 and the bottom end boards 10 and channel sections 13 are formed to the shape illustrated with perforations extending therethrough for the reception of the legs of the rods 12. The rods are threaded through the end boards and bracing members in the manner illustrated at A in Fig. 1, it being understood that all of the rods 12 are in the shape indicated at A when they are threaded through the boards 10 and sections 13. The ends of the bottom end boards are notched at 17 to receive the bottom side boards and the angle irons which will be referred to more particularly hereinafter. One of the bottom end boards is rabbeted at 19 to receive the connecting portion 18 of the U-shaped rods 12 when the rods are in the full operative position shown in Fig. 3; see particularly Figs. 1, 3, and 5. The other bottom end board has a plurality of openings 20 between the pairs of legs of each U-shaped member to receive the inturned hooked ends 21 of the rods 12 indicated at B in Figs. 1 and 3. After the rods are threaded through the members 10 and 13, the ends of the legs of each member are bent inwardly to form hook-shaped portions 21 as indicated at B and are made such a shape that they will enter the recesses 20 when the bottom end boards are moved outwardly away from each other their full permitted extent. It will be understood that the rods are made so that they are just the exact required length in over-all dimension so that when the bottom end boards are moved outwardly as far as permitted, they will be in the desired position to receive the side pieces or adapted to be arranged in the notches 17.

In order to form pockets for the bottles, and to prevent their striking against each other, I provide partition members 22 and 23 each being formed identically with the other and each being formed of longitudinal separators 24 and transverse separators 25 riveted together at 26 and deformed downwardly at 27 to form substantially arcuate contact portions of substantially the same or concentric radius with the bottle to be received in the spaces formed by the separators 24 and 25. Partition members 22 and 23 therefore each form a rectangular grid-work and the free ends of each of the separators 24 and 25 is perforated to receive a fastening means.

Figure 1:
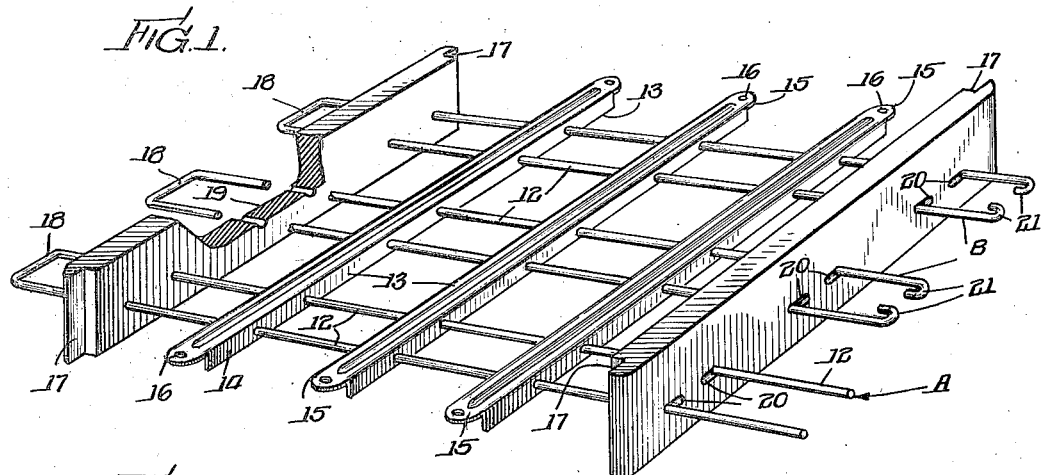
Fig. 1 represents a perspective view of a portion of the bottom of the crate at one stage during its assembly.

While one separator is forming the bottom section of the crate, as illustrated in Fig. 1, another separator is assembling the two partition members 22 and 23 on opposite sides of the center end boards 28. This is done by arranging the opposite ends of the separators 24 of the bottom partition 22 on the bottom side of the center end boards 28 and securing said ends to the boards 28 by means of nails 29 driven in from the under side of the center end boards 28, the boards 28 being preferably inverted for this step of the process. The center end boards 28 and the lower partition 22 secured thereto are then turned right side up and the upper partition 23 is similarly nailed to the upper sides of the center end boards 28 so that the resulting structure consists of center end boards 28 with partition members 22 and 23 secured respectively to the bottom and top sides thereof.

This center unit as it will hereinafter be referred to is then superimposed upon the bottom unit which was first described with the outer and inner surfaces respectively of the center end boards 28 and bottom end boards 10 arranged coplaner. The center end boards 28 and bottom end boards 10 are first held in spaced vertical relation with respect to each other and metal dowel pins 30 are interposed between boards 28 and 10 and held in vertical alignment by means of a special spacing machine and while the boards 28 and 10 are guided by any suitable guiding means they are pressed toward each other in a suitable press and the dowels 30 being pointed at the opposite ends thereof are pressed into the wood of the boards 28 and 10. The dowel pins 30 penetrate the boards 28 and 10 in substantially equal amounts.

The next step in assembling the crate is to superimpose the top end boards 31 on the center end boards 28 with their respective surfaces coplaner, dowels 32 similar to dowels 30 being interposed between sections 31 and 28 to hold the members in alignment with each other. The crate now has the end portions thereof completely assembled and supporting the grid-work which forms the bottom of the crate and partition members 22 and 23.

Figure 3:
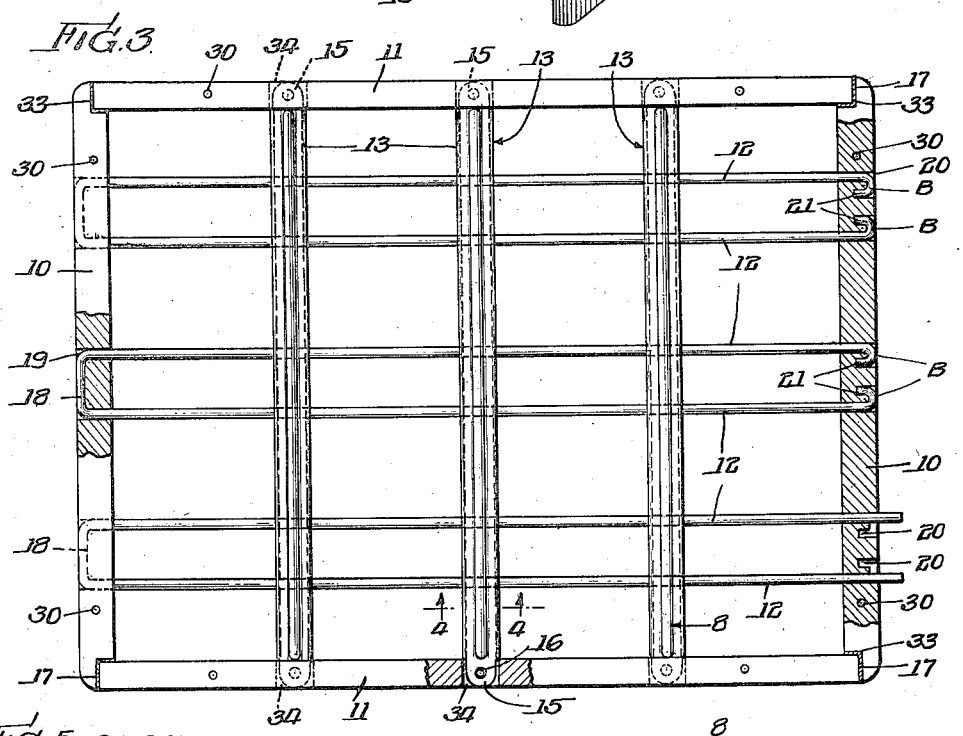
Fig. 3 is a sectional view just above the bottom boards forming the bottom periphery of the crate.
Figure 4:
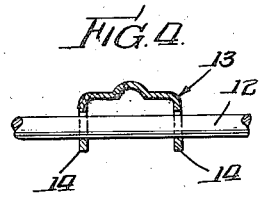
Fig. 4 is a section on the line 4—4 of Fig. 3.

This structure is next sent to a stretching machine in which the end sections formed of the boards 10, 28, and 31, are forced outwardly as a unit away from each other to cause the portions 16 of the rods 12 to enter the recesses 19 and the hooked portions 21 to enter the recesses 20. While the end sections are held in this position, the angle irons 33 are arranged in the notches 17 and one of the bottom side boards 11 is inserted with one end thereof in the angle of the angle iron 33 as illustrated in connection with the bottom side board shown at the front of the crate in Fig. 2, the opposite end of this bottom side board 11 being free but being thereafter forced into the angle of the angle iron 33 at the right of the front side of the crate shown in Fig. 2, the ears 15 being guided into rabbets 34 which extend through the bottom side boards as illustrated in Figs. 2 and 3. Nails 35 are then driven from the under sides of the bottom side boards 11 through the perforations 16 in the ears 15 to hold the bracing members 13 in position. See particularly Figs. 3 and 8. The transverse separators 25 are thereafter nailed in place by nails 36 extending through the ends thereof into the bottom side boards 11 as clearly illustrated at the back of the crate shown in Fig. 2. The forward ends of these same boards are secured in the same manner after the bottom end board 11 is moved into fully operative position between the angle irons 33. The next step is to place the center side boards 37 in position directly above the bottom side boards 11. This is done by inserting the center side boards 37 between the angle irons 33 near their upper ends or at least spaced from the bottom side boards 11 a distance sufficient to permit additional metal dowels 30 therebetween in the same manner as between the boards 28 and 10. The boards 37 and 11 are then brought into engagement with each other by means of suitable presses, the dowels imbedding themselves substantially equally into each of the boards as they are pressed together. The separators 25 of the upper partition 23 normally extend into the plane of the side of the crate and therefore before moving the boards 37 into place, the free ends of the transverse parting members are bent upwardly as illustrated in Fig. 2 out of the path of movement of the board 37 as it is moved toward the board 11. When the board 37 is in place, the ends of the separators are bent downwardly into a horizontal position and the free ends thereof nailed to the center side boards 37 in the same manner as the ends of the transverse members of the lower partition are nailed to the bottom side boards 11. Thereafter the top side boards 38 are moved in between the angle irons 33 and toward the center side boards 37, dowels being inserted therebetween in the same manner as between the boards 37 and 11. Thereafter nails 39 are driven through the side boards and end boards of the crates in two directions as illustrated in dotted lines in Fig. 3.

In order to hold the side members and end members in assembled relation with respect to each other, a corner bracket 40 and having perforations 41 in the ears 42 thereof is arranged over the lower corners of each of the crates embracing the bottom side and end members and being held securely thereto by means of rivets 43 passing through the perforations 41 and the end and side members. As illustrated in the vertical sectional view through the end member, in Fig. 12, the bottom connecting web 44 has a downwardly extending end portion 45 adapted to penetrate the wood of the lower side of the bottom end board and bottom side board. (Only the bracket in which it penetrates the bottom end board is shown in Fig. 12, it being understood that the same penetrates the bottom side board in the same manner.) The lower corner of the crate is recessed slightly to about the thickness of the metal corner bracket 40 so that the bottom side thereof is substantially flush with the bottom side of the bottom side and end boards so that in moving the crate over the floor or in stacking the crates one on top of the other, the edges of the corner brackets are not turned up and loosened as commonly occurs in connection with corner brackets not provided with inturned portions 25. The inturned portions 25 also act as a means whereby the corner bracket will ride over obstructions.

In Figs. 6 and 7, I have illustrated a modified form of my invention in which the rods 47 are substituted for the rods 12 shown in the form of the invention illustrated in Figs. 1 to 5, etc. The rods 47 are originally formed with upset ends 48, the opposite ends 49 being upset only after the rods have been threaded through the members 10 and 13 with washers 50 on the rods between the bottom end boards 10 and the upset ends 48 and 49 on the rods. The holes in the end members through which the rods extend are countersunk at 51 slightly to receive the washers 50 and the upset ends 49 so that the upset ends do not extend beyond the outer surfaces of the bottom end boards 10. After the bottom sections has been assembled as in Fig. 6, the rest of the crate is assembled in the manner set forth in the first embodiment of the invention herein described.

Obviously those skilled in the art to which this invention pertains may make various changes in the modifications of the invention herein disclosed without departing from the spirit of this invention or the scope of the appended claims, and therefore I do not wish to be limited in my invention except as set forth hereinafter in the appended claims.

Having thus fully described my invention, what I claim as new and desire to obtain by Letters Patent is:

1. In a crate construction, the combination with a frame comprising end boards having openings therein, a plurality of U-shaped rods having their legs extending through opposed corresponding openings in both of said end boards, the legs of said U-shaped members being upset at their free ends to prevent removal of said end members off said rods and to limit the movement of said end boards away from each other, said end and intermediate portions extending in grooves formed on the outer surfaces of the frame whereby to house said portions within the surfaces of the frame and side boards connected to and extending between said end boards.

2. In a crate construction, the combination with end boards having corresponding parallel openings, a plurality of U-shaped rods having their legs extending through said openings, and an upset hooked end on each of said legs of said U-shaped members, said upset ends and the portions of said U-shaped members which connect said legs cooperating for the purpose of limiting the outward movement of said end members away from each other, and side boards interposed between said end boards of sufficient length to impart a tension to said rods when said side boards are interposed between said end boards and to prevent movement of said end boards toward each other.

3. In a crate, the combination with a lower frame member having openings in opposite ends thereof, terminal rods comprising U-shaped members having legs extending through said openings and having the end and intermediate portions thereof extending outside of said frame and formed to prevent longitudinal movement of said legs in the frame and for holding said rods under tension, and transverse bracing strips for said rods having portions embracing said rods and having the opposite ends thereof arranged in openings in the side members of said frame whereby said rods are supported intermediate their ends.

4. In a crate, a frame comprising side and end boards, a plurality of channel shaped spacer members having spaced flanges formed with registering perforations extending between the side boards, a plurality of U-shaped tension rods having legs penetrating the end walls and the perforations of said spaced flanges of the spacer members, the intermediate portion and leg ends of said tension rods extending in grooves in the outer surfaces of said end boards and hence lying within the outer surfaces of said crate.

FRANK J. KRZYZAK.